Oct. 11, 1932.                S. BERRY                1,882,205
                       MACHINE FOR MOLDING BLOCKS
                        Filed Sept. 30, 1929        3 Sheets-Sheet 1
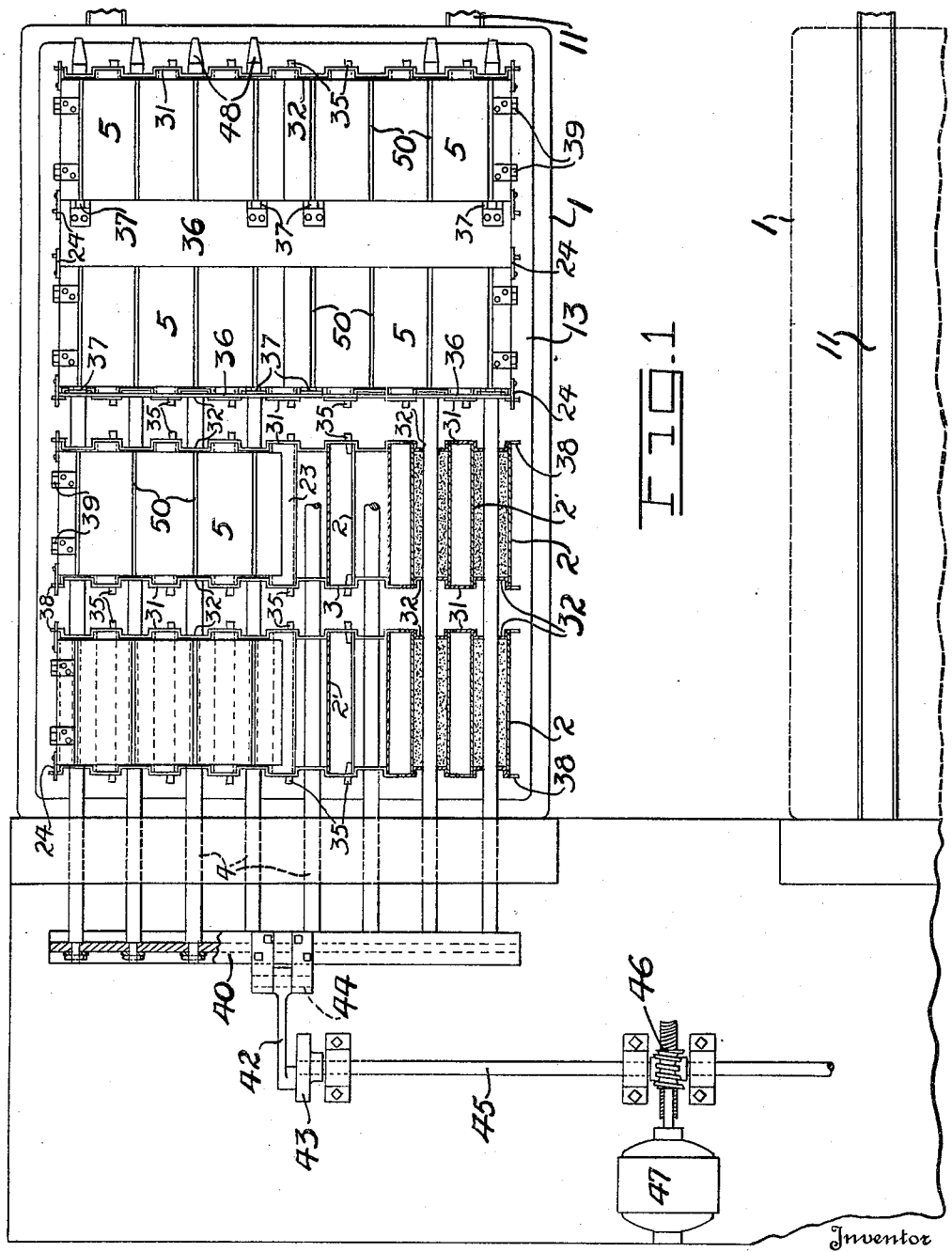

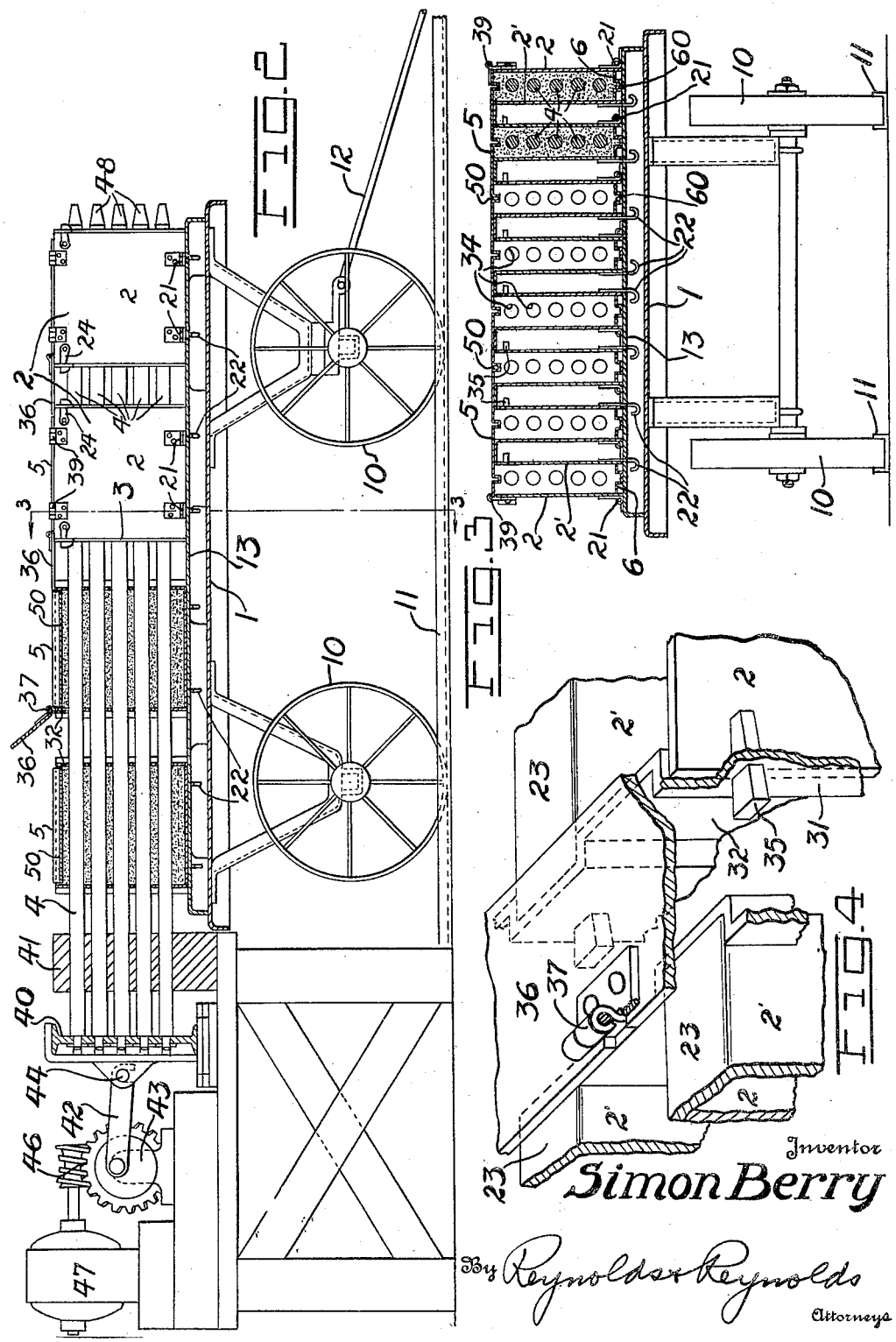

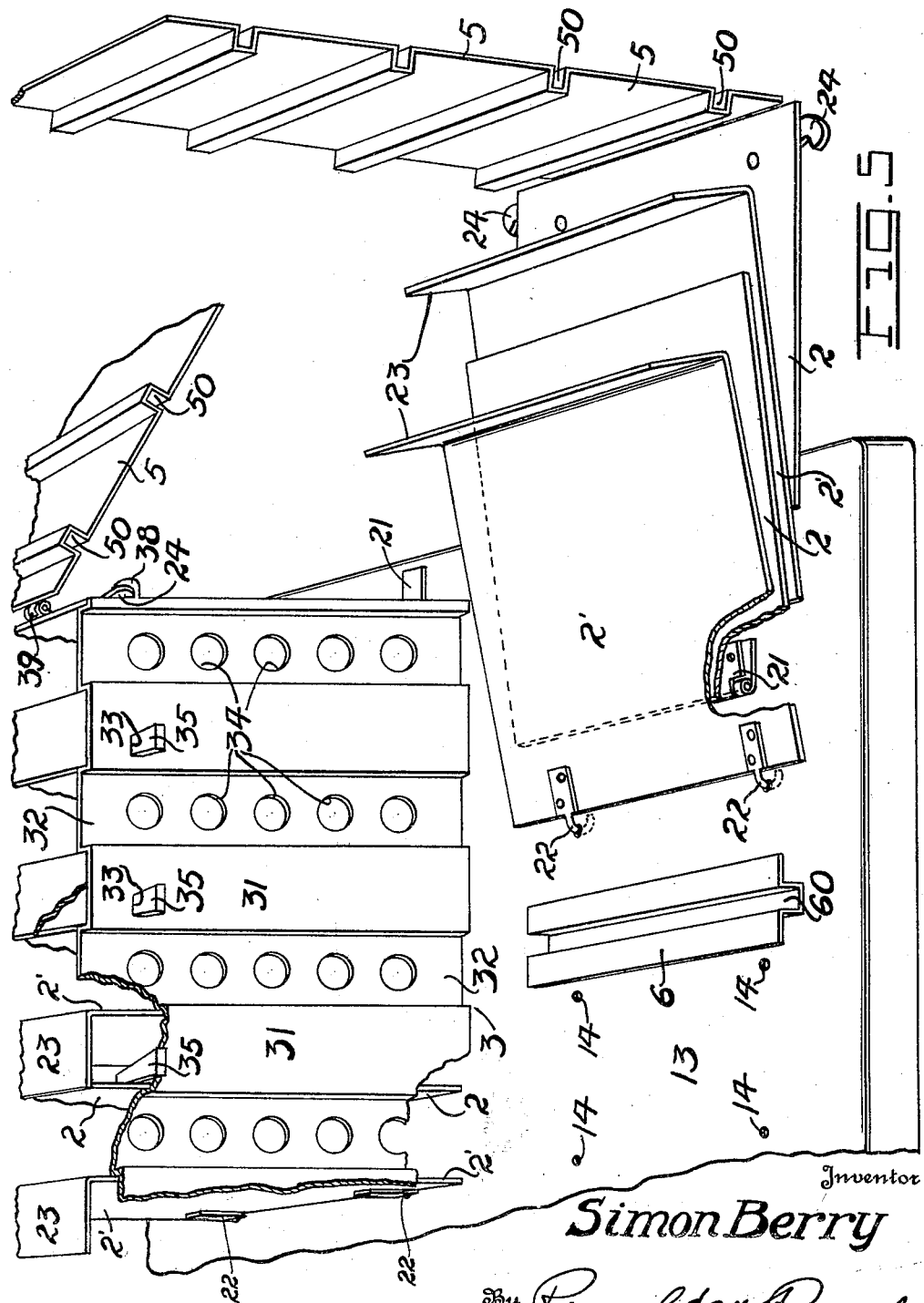

Patented Oct. 11, 1932

1,882,205

UNITED STATES PATENT OFFICE

SIMON BERRY, OF SEATTLE, WASHINGTON

MACHINE FOR MOLDING BLOCKS

Application filed September 30, 1929. Serial No. 396,090.

My invention relates to a machine for use in the molding of building blocks and the like.

My machine is intended to be used in the molding of blocks of gypsum or plaster of Paris, generally having a filler or fibre incorporated therein, and formed with holes or recesses extending from end to end through them.

In the molding of such blocks, as heretofore practiced, it was a long and tedious job to set up the molds for each pouring, and a large amount of time and labor was consumed in cleaning up the mold parts after removal of the blocks. It is preferable that the blocks be cast on edge, for by so doing the filler is more uniformly distributed throughout the blocks and a larger number of blocks can be cast at one time, but this adds to the difficulty of forming the mold and cleaning and replacing the mold parts after use. It is my object, then, to provide a mold wherein the several parts are so formed and arranged relative to each other that they can quickly be set up and as quickly taken apart, separated from the blocks, and cleaned.

A further object is the provision of a mold of this type wherein the mold parts are so formed that they can in general be taken down to allow the removal of one block at a time without disturbance of adjoining blocks, thus making the separation between the blocks and the mold walls a comparatively simple matter.

A further object is the provision of a mold of this general type wherein the several parts may be conveniently and inexpensively manufactured, and wherein the several parts are interconnected and mutually support each other.

A further object is the provision of a molding machine of this character wherein provision is made for obtaining relative movement of the mold and the rods which extend through the mold spaces to form the passages running through the blocks, this motion being obtained by movement of the mold relative to the rods, of the rods relative to the mold, or either type of movement.

Other objects, and particularly such as refer more especially to details of construction, will be ascertained from a study of the drawings and specification forming part of this application.

My invention comprises the novel parts and the novel combination and arrangement thereof as shown in the accompanying drawings, described in the specification, and as will be more particularly defined by the claims which terminate the same.

In the accompanying drawings, I have shown my invention in a form which is now preferred by me.

Figure 1 is a plan view of one unit of my machine, parts being broken away.

Figure 2 is a side elevation thereof, parts being shown in longitudinal section.

Figure 3 is a transverse section on the line 3—3 of Figure 2.

Figure 4 is a detail in perspective of the upper edge of the mold part.

Figure 5 is a perspective view of the mold table and associated parts, certain thereof being shown assembled and others being shown knocked down.

Essentially, my device consists of a mold table, designated in general by the numeral 1, mold parts consisting of the longitudinal walls 2 and the transverse walls 3 supported thereon, and rods 4, preferably horizontal and arranged in vertical series, of which there may be several series, side by side, these rods projecting through the mold spaces formed by the walls 2 and 3. Means are provided for causing relative movement between the mold table 1 and the rod 4, longitudinally of the rod, and to this end I may secure one end of the rod in a crosshead 40, the rod being guided for movement in a template 41. Movement of the crosshead 40 and rod 4 may be suitably caused, as by a pitman 42, reciprocated slowly by a crank disk 43, the pitman being hooked upon a pin 44 carried by the crosshead 40 and the crank disk 43 being carried upon a shaft 45, which is turned through a worm gear and pinion, illustrated at 46, from a motor 47. A plurality of such crossheads 40 may be connected up to a single motor, within the capacity of the motor, and in Figure 1 I have illustrated an arrangement whereby the rods for two mold units are driven from a single motor. The rods, of course, would be somewhat pointed at their ends as indicated at 48, to enable them to enter apertures provided for them in the transverse plates 3, these being designated by the numeral 34.

Relative reciprocal movement between the mold and the rod 4 may be obtained by movement of the table 1 relative to the rod, and in order to obtain proper registry between the rod 4 and the apertures 34, the table, which is shown as mounted upon wheels 10, may be moved lengthwise of the rods 4 on tracks 11 upon the floor, upon which the wheels 10 are guided. The longitudinal movement of the table relative to the rod 4, in withdrawing the table by means of the tongue 12, may be relied upon to break the connection tending to form between the rod 4 and the blocks in process of setting, or this relative movement may be accomplished through the pitman 42, or by both of these means combined.

Upon the table 1 is supported a false bottom 13, upon which are directly secured certain of the mold walls, preferably the longitudinal walls 2. This connection is preferably a hinge-like connection; thus certain of the walls 2, preferably those near the outside of any particular mold space, are directly hinged as indicated at 21, to the false bottom 13. The wall at the inner side of any given mold space, which for convenience may be designated by the numeral 2', is preferably permitted to raise slightly above the floor level of the false bottom 13 when the mold is being disassembled, and for this purpose a hooked rod 22 may extend downwardly from the bottom edge of the wall 2' and through holes 14, provided at proper intervals in the false bottom 13. As indicated in Figure 5, the several walls 2 or 2' are thrown down substantially horizontal when the mold is disassembled during removal of the blocks.

It will be noted that the walls of adjacent mold spaces are themselves spaced from one another. This enables the walls of each mold space to be separated from the block uninfluenced by the block in the adjacent mold, and each wall of the mold space, at least each of the longitudinal walls 2 or 2', may be individually freed from the block within the mold. This, however, necessitates protecting the space between the mold spaces so that the plaster does not get into this space to block it up, and to protect this space, I may provide a flange 23, which is shown as integral with the walls 2', which flange extends over the top of this space, abutting against or fitting over the top edge of the opposite wall 2. The mold spaces are spaced from one another longitudinally as well as transversely, but with the longitudinal walls 2 and 2' hinged to the bottom 13, it is not feasible to hinge the transverse wall 3, and they would ordinarily be formed to engage with the ends of the walls 2 to be supported thereby and to support and space the longitudinal walls. Thus, as may be seen in Figure 5, the transverse walls 3 are corrugated or channeled, portions 32 fitting between the opposite walls 2 and 2' of a given mold space and the portion 31 extending about the end of the walls 2 and 2' of adjoining mold spaces. The sections 32 carry the apertures 34, while the portions 31 may be provided with slots 33 for the reception of wedges 35 or like means which may be driven through these slots to engage with the back sides of the plates 2 to properly hold them in position relative to each other and to the transverse plates 3. As shown in the drawings, the integral covers 23 fit within the portions 31 to support and space the walls 2'. In this way all of the plates mutually support each other and the entire mold may be collapsed upon removal of the end plates 3.

It is equally necessary to protect the space between adjacent transverse plates 3, and to this end cover plates 36 may be provided to close these spaces; however, since it is customary to cover over the mold spaces with plates such as 5, the cover plates 36 may be hingedly secured to the edge of a cover plate 5 as is indicated at 37 (see Figures 1 and 4).

Such a mold will be easily set up or knocked down, and the individual walls each defining a single mold space may be readily loose from the blocks; in fact, less than a minute is required to set the block sufficiently to permit removal of the mold plates. In consequence, it is but a short job to remove the several mold plates, remove the blocks, clean the plates and again set them up since there is no necessity of fitting parts to position and they naturally fall into the positions they should assume.

Such a mold may be employed for making blocks with planiform sides or edges, or they may be employed for making tongue and groove blocks. They are illustrated arranged to make tongue and groove blocks in the drawings, and for this purpose the cover plates 5 may be channeled as is indicated at 50, this forming the groove at the top edge of the block. The plates 5 are hinged at 39 to the longitudinal walls 2. In order to form the corresponding tongue at the bottom edge of the block a channeled plate 6 and groove 60 may be dropped into the bottom of each mold space.

It has been found that placing the blocks thus on edge and to a large extent filling the mold space with the rods 4 has the tendency to cause the filler, which is previously incorporated into the plastic or substantially liquid mass, to remain distributed throughout the mold space. Even though such a filler as sawdust or wood chips, which would ordinarily float, be employed, it will still not separate from the mass, and hence the process of casting the blocks on edge as described, is superior to any process of which I am aware by which the blocks are cast flat, such as the process of my prior Patent No. 1,698,120.

What I claim as my invention is:

1. A block molding machine including a table and a plurality of longitudinal walls and freely removable transverse end walls supported thereon, hinged connections between said longitudinal walls and the table, and means for securing said transverse end walls upon the longitudinal walls.

2. A block molding machine as in claim 1, said longitudinal and transverse walls including interengageable means for mutual support and spacing.

3. A block molding machine including a table and a plurality of molds each comprising longitudinal walls supported on the table and end walls including spacer means, mutually interengageable between the ends of said longitudinal walls to maintain the several molds spaced at all sides from the other molds, hinged connections between the table and two opposite longitudinal walls of each mold, the end walls being releasably supported from the hingedly supported walls, and covers formed upon one of said sets of walls to close the spaces between the molds.

4. A block molding machine as in claim 3, the longitudinal walls being hingedly supported, and the covers being formed as integral flanged extensions thereof.

5. A block molding machine as in claim 3, the longitudinal walls being hingedly supported, and the transverse walls being channeled to fit between and properly space the longitudinal walls, constituting the spacer means.

6. In a block molding machine, a table, a plurality of walls defining narrow mold spaces, horizontal rods extending in vertical series through said mold spaces, and means for causing reciprocating movement of the rods relative to the mold walls, while thus disposed within the mold spaces.

7. In a block molding machine, a table, a plurality of walls thereon defining parallel and aligned narrow mold spaces, horizontal rods extending in vertically arranged series through a plurality of aligned mold spaces, and extending therebeyond, and means for causing relative longitudinal reciprocating movement of the rods and the mold walls of less amplitude than the amount of extension of the rods beyond the mold space.

8. A block molding machine comprising a table, a series of parallel walls hingedly supported thereon, a second series of parallel walls interspersed between and spaced from the walls of the first set to form spaced-apart mold spaces, end connecting walls associated therewith, and covers integral with said second series of parallel walls to cover the spaces between adjacent mold spaces.

9. A block molding machine as in claim 8, the end connecting walls being common to a plurality of parallel walls and likewise spaced apart to leave a space between adjacent blocks of molds, and covers fitting the spaces between said end connecting walls.

10. In a block molding machine, a table, a plurality of walls thereon defining mold spaces, horizontal rods extending through such mold spaces, means to reciprocate the several rods each within its mold space, and means permitting movement of the table lengthwise of the rods to remove the rods from the mold spaces.

11. In a block molding machine, in combination, a table, a set of parallel longitudinal walls hingedly supported thereon, covers formed integral therewith, spacing means to properly space and position said parallel walls comprising channeled end walls abutting each end of a plurality of said parallel longitudinal walls, and having inwardly and outwardly projecting vertical channels, said outwardly projecting channels adapted to snugly receive therein said longitudinal walls and said integral covers, the walls, covers and channels being formed and proportioned to hold said longitudinal walls firmly in position against longitudinal shoulders of said channeled end walls.

12. In a block molding machine in combination, a table, parallel walls supported thereon, and sheet metal end walls bent to form a series of vertical channel spaces, the inwardly projecting portions forming the end walls of mold spaces, and the outwardly projecting portions adapted to receive and space the ends of said parallel walls.

13. A block molding machine comprising a table, a series of parallel walls hingedly supported thereon, a second series of parallel walls interspersed between and spaced from the walls of the first set to form spaced-apart mold spaces, said second series of walls having integral covers to cover the spaces between the adjacent mold spaces, channeled end walls common to a plurality of said parallel walls at each end, and extending thereabove, the inward projecting portions of said channeled end walls being opposite and forming the end walls of the mold spaces, and each pair of adjacent parallel walls, one from each of said series, being adapted to fit within the outwardly projecting portions of said end walls, and pegs to support the walls of the first series against parallel faces of said end walls, the integral cover of the other parallel wall fitting closely within the outwardly projecting portion of the end walls to hold the latter parallel wall against the parallel face in said end wall opposite to the first mentioned parallel face.

Signed at Seattle, Washington, this 19th, day of August, 1929.

SIMON BERRY.